United States Patent [19]
Tomita

[11] Patent Number: 6,007,720
[45] Date of Patent: Dec. 28, 1999

[54] PROCESS FOR TREATMENT OF ORGANIC WASTEWATER

[75] Inventor: Minoru Tomita, Yokohama, Japan

[73] Assignee: Organo Corp., Tokyo, Japan

[21] Appl. No.: 09/038,313

[22] Filed: Mar. 11, 1998

[51] Int. Cl.$^6$ .................................. C02F 3/30; C02F 3/06
[52] U.S. Cl. .......................... 210/605; 210/615; 210/622; 210/630; 210/747
[58] Field of Search ...................................... 210/605, 610, 210/615–619, 623, 630, 747, 621, 620, 622

[56] References Cited

U.S. PATENT DOCUMENTS

| | | |
|---|---|---|
| 3,855,120 | 12/1974 | Garbo . |
| 4,113,613 | 9/1978 | Sekoulov et al. . |
| 4,201,663 | 5/1980 | Rollag et al. . |
| 4,419,239 | 12/1983 | Frankl . |
| 4,431,543 | 2/1984 | Matsuo et al. . |
| 5,180,495 | 1/1993 | Thuer et al. . |
| 5,531,896 | 7/1996 | Tambo et al. . |
| 5,545,326 | 8/1996 | Petering . |
| 5,667,688 | 9/1997 | Kerrn-Jespersen et al. . |

FOREIGN PATENT DOCUMENTS

| | | |
|---|---|---|
| 9-168790 | 6/1997 | Japan . |

OTHER PUBLICATIONS

"Wastewater Engineering, Third Edition," published by McGraw–Hill Publishing Company, 1991, pp. 398–400 and pp. 604–614.
Derwent Abstract of JP 9–168790, Week 199736 B, 1998.
JPO & JAPIO abstract of JP 9–168790, 1990.

*Primary Examiner*—David A. Simmons
*Assistant Examiner*—Fred Prince
*Attorney, Agent, or Firm*—Sprung Kramer Schaefer & Briscoe

[57] ABSTRACT

The disclosed process for treatment of organic wastewater such as manure-washing wastewater discharged from the livestock industry or wastewater discharged from the food industry comprises the step (1) of subjecting the organic wastewater to an aerobic biological treatment, and the step (2) of subjecting the treated water obtained in the step (1) to a biological treatment in a lagoon. The process may further comprise, before the step (1), the step of subjecting a mixture of the organic wastewater and part of the treated water obtained in the step (1), recycled back and combined therewith, to a biological denitrification treatment. The treated water obtained by the process is so improved in quality as to enable safe disposal thereof. A submerged biofilter process (packed-bed reactor process) is preferably used in the aerobic biological treatment since it can remarkably improve the overall stability of the whole wastewater treatment process to obtain a stable quality of treated water.

3 Claims, No Drawings

PROCESS FOR TREATMENT OF ORGANIC WASTEWATER

BACKGROUND OF THE INVENTION

1. Field of the Invention

The present invention relates to a process for treatment of organic wastewater, and particularly to a process for biological treatment of organic wastewater such for example as manure-washing wastewater discharged from the livestock industry or wastewater discharged from the food industry though the organic wastewater is not particularly limited thereto.

2. Related Art

High concentrations of organic matter and nitrogen components such as organic nitrogen and ammonia are contained in organic wastewaters such for example as manure-washing wastewater discharged from the livestock industry and wastewater discharged from the food industry. Thus, such organic wastewaters are desired to be discharged to environment after they are rendered harmless.

For example, wastewater resulting from washing livestock manure (feces and urine) with water is treated by a combination of a plurality of treatment methods, examples of which include solid-liquid separation, composting, evaporation and concentration, and biological treatment.

In regions having a large farming area, the wastewater resulting from washing livestock manure with water is mostly biologically treated in lagoons requiring not many hands and involving easy maintenance and control thereof. Oxygen supply for decomposition of contaminants in a common lagoon without aeration relies only on diffusion of oxygen from the surface of the lagoon, or pond. Hence, the treatment is so inefficient that the resultant treated water in the lagoon still contains a high concentration of undecomposed organic matter. Treatment in this kind of lagoon is a combination of aerobic biological treatment with anaerobic biological treatment. Since the anaerobic biological treatment is dominant in this case, however, organic nitrogen and ammonium nitrogen cannot well be removed. In general, the treated water obtained in the lagoon is mostly percolated downward through the soil either as it is or after it is sprinkled over the ground or used for irrigation of a plowed field, or evaporated for final disposal thereof.

Examples of lagoons improved over the foregoing common lagoon include an aerated lagoon with an aerator(s) capable of positively dissolving molecular oxygen in lagoon water, a lagoon capable of utilizing molecular oxygen generated by growth of aquatic plants such as algae, and a lagoon having an aerobic zone capable of nitrification with the aid of aeration of the zone with an agitating aerator and an anaerobic zone capable of denitrification. In all such lagoons, however, the efficiency of decomposition of organic matter as well as the efficiency of nitrification and denitrification is not so well because of a low microorganism concentration therein. Accordingly, these lagoons may leak harmful substances such as undecomposed organic matter, organic nitrogen, ammonium nitrogen, and nitric nitrogen (nitrate nitrogen) and nitrous nitrogen (nitrite nitrogen) both formed by nitrification of ammonium nitrogen to the environment and in particular to groundwater when it rains and/or the resultant treated water percolates through the soil. This has become a problem. The contamination of groundwater is a problem in particular because strongly toxic nitrous acid contaminates drinking water. One cause of this is percolated water from lagoons.

On the other hand, composting, evaporation and concentration, and the like method involve emission of malodors, while treated water obtained only through a simple treatment such as solid-liquid separation, if discharged to a drinking water source such as a river or a lake, becomes a problem because of a high possibility that protozoa such as *Cryptosporidium* and parasites might be contained in such treated water.

In stock farms, which are generally run by a small number of people in many cases, treatment processes such as an activated-sludge process, which require considerable labor for maintenance and control thereof, are impractical. Furthermore, since protozoa cannot be removed by the activated-sludge process, discharge of treated water obtained by this process to rivers and the like presents a problem.

An object of the present invention is to provide a wastewater treatment process capable of efficient biological treatment of organic wastewaters such as wastewater from the livestock industry and wastewater from the food industry for making the wastewaters harmless.

SUMMARY OF THE INVENTION

As a result of extensive investigations with a view to attaining the above-mentioned object, the inventor of the present invention has found out that either an aerobic biological treatment of organic wastewater, or biological denitrification treatment and aerobic biological treatment of organic wastewater, if done as a pretreatment before treatment in a lagoon, can improve the quality of treated water obtained in the lagoon, whereby organic wastewater such as wastewater from the livestock industry or wastewater from the food industry can be disposed of safely. The present invention has been completed based on this finding.

The inventor of the present invention has also found out that, when a submerged biofilter process (i.e., packed-bed reactor process, the same will apply hereinafter) is used in the aerobic biological treatment, the overall stability of the whole wastewater treatment process can be remarkably improved to obtain a stable quality of treated water.

More specifically, in accordance with the present invention, there is provided a process for treatment of organic wastewater, comprising the step (1) of subjecting organic wastewater to an aerobic biological treatment, and the step (2) of subjecting the treated water obtained in the step (1) to a biological treatment in a lagoon.

The process of the present invention may further comprise, before the step (1), the step of subjecting a mixture of organic wastewater and part of the treated water obtained in the step (1), recycled back and combined therewith, to a biological denitrification treatment.

The aerobic biological treatment done as a pretreatment before the treatment in the lagoon can decrease the load of organic matter including organic nitrogen (the efficiency of treatment thereof is very poor when treated in the lagoon alone) and flowing into the lagoon, whereby the quality of final treated water obtained in the lagoon can consequently be improved. Further, the aerobic biological treatment decomposes almost all of the organic nitrogen into ammonium nitrogen and further nitrifies ammonium nitrogen, whereby the incoming ammonium nitrogen load onto the lagoon can be decreased. The influent nitrous nitrogen and nitric nitrogen are denitrified by facultative anaerobes living in the lagoon, whereby the nitrogen concentration of the final treated water can be lowered not to cause underground contamination.

When a mixture of organic wastewater and part of treated water obtained by the aerobic biological treatment, recycled back and combined with the organic wastewater, is subjected first to the biological denitrification treatment, and then to the aerobic biological treatment to effect a recycled biological treatment in the plug-flow system with cellular recycle as a pretreatment before the treatment in the lagoon, the incoming nitrogen load onto the lagoon can be further lowered, whereby the nitrogen concentration of final treated water obtained by the treatment in the lagoon can be lowered just like in the foregoing case not to cause underground contamination.

More specifically, the organic nitrogen becomes substantially inexistent in the pretreated water, i.e., water flowing into the lagoon, with decreases in organic matter concentration, nitrous and nitric nitrogen concentration and ammonium nitrogen concentration as a result of the pretreatment, whereby aeration of the lagoon, though may be done, becomes little necessary, and the organic matter concentration as well as nitrous, nitric and ammonium nitrogen concentrations of final treated water obtained by the treatment in the lagoon can be greatly lowered not to cause groundwater contamination. Thus, the final treated water in the lagoon can be percolated through the soil without any problems either as it is or after it is sprinkled over the ground or used for irrigation of a plowed field. The problem with protozoa and parasites can also be solved because the final treated water in the lagoon is not required to be discharged to a river or the like.

As described above, according to the process of the present invention, the size of the lagoon can be minimized with little need of aeration of the lagoon because of the low incoming organic matter and nitrogen loads onto the lagoon. Furthermore, the final treated water obtained by the treatment in the lagoon is also so low in nitrogen concentration that a large amount of it can be either sprinkled over a small-area plot of ground or used for irrigation of a small-area plowed field. Inversely speaking, since the area of ground or plowed field, required for sprinkling or irrigation with the final treated water, may be so small that small-scale stock farms can advantageously use the process of the present invention.

Examples of the aerobic biological treatment include the activated-sludge process (either a continuous process or a batch process), a trickling filter process, a submerged biofilter process (packed-bed reactor process), a fluidized bed process, and a rotating biological contactor process though not particularly limited thereto. Although treatment processes such as the activated-sludge process, which require considerable labor for maintenance and control thereof, may be impractical in stock farms run by a small number of people as described before, they are practical in stock farms run by a large number of people. The aerobic biological treatment is done especially preferably by the submerged biofiter process for reasons as will be given later. Additionally stated, it is a matter of course that excess sludge resulting from the aerobic biological treatment may be removed in the form of a cake in every process.

The activated-sludge process is a method wherein flocculated biological growths are homogeneously mixed and contacted with organic wastewater to be treated in the presence of molecular oxygen fed thereto by aeration. The continuous activated-sludge process is, for example, a method wherein organic wastewater is continuously sent to at least an aeration unit or tank and a settling unit or pond (sedimentation/clarification unit or pond) in this order in the plug-flow system with recycle to take an aeration step in the aeration unit or tank and then a solid-liquid separation step in the settling unit or pond, from which part of the separated sludge is returned, or recycled back, for admixture thereof with the wastewater. On the other hand, the batch activated-sludge process is a method wherein organic wastewater is intermittently fed to an activated sludge unit in the flow-through activated-sludge system without recycle to take an aeration step and a solid-liquid separation step each time on a batch-wise basis without recycling back part of the separated sludge.

The trickling filter process is a fixed-bed treatment method wherein organic wastewater is either intermittently or continuously distributed over and trickled down through a trickling filter charged with filter media made of stone, a granular plastic material, a mesh material, or the like to come into contact with biological films formed on the surfaces of the filter media. Aerobic conditions are maintained by a flow of air through the filter bed induced by the difference in specific weights of the atmosphere inside and outside the bed (due to the temperature difference between the ambient air and the air inside the filter media). In some cases, however, forced draft ventilation is employed. Periodic sloughing of biological films on the filter bed is discharged to secondary settling/clarification units.

The submerged biofilter process is a method wherein a filter bed provided in a treatment unit is submerged in organic wastewater as water to be treated, whereby the organic wastewater is biologically treated. This process may be used for either an aerobic biological treatment or an anaerobic biological treatment. In the former, an oxygen-containing gas such as air or oxygen gas is blown into the unit to effect aeration of the wastewater.

The fluidized bed process is a method wherein a carrier for microorganisms, examples of which include activated carbon, sand, and pumice all having a specific gravity exceeding that of organic wastewater as water to be treated, is fluidized in the presence of the organic wastewater in a treatment unit or tank while feeding thereto air, oxygen gas or the like via a gas diffuser provided in a lower portion of the treatment unit or tank to form a fluidized bed made of the carrier to which biological growths are attached, whereby the organic wastewater is biologically treated.

The rotating biological contactor process is a method wherein a rotating biological contactor comprising a series of closely spaced circular disks of polystyrene, polyvinyl chloride or the like to which biological growths are attached is partly submerged in organic wastewater with rotation of the disks to secure the contact of the biological growths with the wastewater and the contact of the rotating disks with the atmosphere for air capture.

The biological denitrification treatment, examples of which include a suspended-growth denitrification process, a submerged-biofilter denitrification process, and a fluidized-bed denitrification process, may be effected either by an early-stage denitrification process wherein organic wastewater is passed through units in the order of denitrification unit → (oxidation unit) → nitrification unit while recycling back part of treated, or nitrified, water from the nitrification unit to combine that part of nitrified water with the organic wastewater fed or to be fed to the denitrification unit, or by a later-stage denitrification process wherein organic wastewater is passed through units in the order of (oxidation unit) → nitrification unit → denitrification unit. When the later-stage denitrification process is employed in the present invention, the nitrified water from the nitrification unit may be flowed directly into the lagoon via no denitrification unit to effect the denitrification treatment in the lagoon by making the most of facultative anaerobes living in the lagoon though the nitrified water may be flowed via a denitrification unit into the lagoon. Herein, the denitrification unit is a unit wherein an anaerobic biological treatment is effected, and to which a hydrogen donor such as an alcohol may be added if necessary. The oxidation unit, which may be provided if necessary though not always necessary, is an aerobic biological treatment unit to which molecular oxygen is positively fed by aeration mainly to effect oxidative degradation of organic matter as the BOD component by the action of BOD-oxidizing bacteria. The nitrification unit is an aerobic biological treatment unit wherein an aerobic biological treatment is effected mainly to convert ammonium nitrogen into nitrous nitrogen and nitric nitrogen. Additionally stated, facultative anaerobes, which also act as aerobes capable of propagation under aerobic conditions, are microorganisms also capable of propagation by using oxygen in nitric and nitrous groups substantially in the absence of molecular oxygen.

Final treated water obtained in the lagoon by biologically treating organic wastewater such as manure-washing wastewater discharged from the livestock industry or wastewater discharged from the food industry according to the process of the present invention contains phosphorus, which serves as a nutrient for production of agricultural products. Thus, it can be used for irrigation of a plowed field. Alternatively, it may be used as general-purpose water for use in cleaning a cattle pen such as a pigpen, and the like.

PREFERRED MODES FOR CARRYING OUT THE INVENTION

A case where organic wastewater obtained by solid-liquid separation of wastewater resulting from washing manure (feces and urine) with water and discharged from a cattle pen such as a pig pen is used as the starting water to be treated by the process of the present invention will now be described as a representative example.

First Embodiment

Organic wastewater (starting water) obtained by solid-liquid separation of manure-washing wastewater discharged from a cattle pen either with a screen or according to tangential flow separation or the like is once stored in a starting water tank. The organic wastewater is fed from the starting water tank to an aerobic biological treatment unit wherein an aerobic biological treatment is effected while feeding thereto an oxygen-containing gas such as air or oxygen gas. In this aerobic biological treatment, ammonium nitrogen ($NH_4^+$) contained in the organic wastewater is nitrified by the action of nitrite-forming bacteria and nitrifying bacteria as aerobes, or aerobic microorganisms, to convert it to nitrous and nitric nitrogens ($NO_2^-+NO_3^-$), while the BOD component is oxidized and degraded by the action of BOD-oxidizing bacteria as aerobes. In other words, in this embodiment, the aerobic biological treatment unit as a single unit plays the roles of both an oxidation unit and a nitrification unit, and is therefore desired to be increased in capacity when this embodiment is compared with the following second embodiment. The treated water obtained from the aerobic biological treatment unit is fed into a lagoon wherein denitrification ($N_2\uparrow$) of nitrous and nitric nitrogens ($NO_2^-+NO_3^-$) is mainly effected by the action of facultative anaerobes (denitriying bacteria) living in the lagoon to further improve the quality of treated water. The final treated water in the lagoon may be percolated through the soil either as it is or after it is sprinkled over the ground or used for irrigation of a plowed field, or may be used for washing the cattle pen.

Second Embodiment

Organic wastewater (starting water) obtained by solid-liquid separation of manure-washing wastewater discharged from a cattle pen either with a screen or according to tangential flow separation or the like is once stored in a starting water tank. The organic wastewater is combined with part of nitrified water returned, or recycled back, from a nitrification unit as will be described later. The mixture may be formed either in a denitrification unit or in a line between the starting water tank and the denitrification unit, provided that the line may be provided with an in-line mixer or the like. In the denitrification unit, the mixture is subjected to denitrification treatment by the action of denitrifying bacteria as facultative and/or anoxic (strict, or obligate) anaerobes. The treated, or denitrified, water is then fed to an oxidation unit wherein oxidative degradation of organic matter contained in the denitrified water is mainly effected by the action of BOD-oxidizing bacteria as aerobes while feeding thereto an oxygen-containing gas such as air or oxygen gas. The treated, or oxidized, water obtained from the oxidation unit is then fed to the nitrification unit wherein an aerobic biological treatment thereof is effected while feeding thereto an oxygen-containing gas such as air or oxygen gas. In this aerobic biological treatment, nitrification of ammonium nitrogen ($NH_4^+$) contained in the organic wastewater is mainly effected by the action of nitrite-forming bacteria and nitrifying bacteria as aerobes to convert it to nitrous and nitric nitrogens ($NO_2^-+NO_3^-$) while further effecting oxidative degradation of the BOD component by the action of BOD-oxidizing bacteria as aerobes. Part of the treated, or nitrified, water from the nitrification unit is sent to a lagoon wherein denitrification of nitrous and nitric nitrogens ($NO_2^-+NO_3^-$) is mainly effected by the action of facultative anaerobes (denitrifying bacteria) living in the lagoon to further improve the quality of treated water. The final treated water in the lagoon may be percolated through the soil either as it is or after it is sprinkled over the ground or used for irrigation of a plowed field, or may be used for washing the cattle pen. The other part of the nitrified water from the nitrification unit is returned, or recycled back, either to the denitrification tank or to the line between the starting water tank and the denitrification unit to be combined with the organic wastewater as the starting water from the starting water tank, whereby denitrification ($N_2\uparrow$) of nitrous and nitric nitrogens ($NO_2^-+NO_3^-$) contained in that other part of the nitrified water is repeated by the action of denitrifying bacteria as facultative and/or anoxic (strict, or obligate) anaerobes. The flow rate of the nitrified water recycled from the nitrification unit back to the denitrification unit, which rate may be varied in accordance with a desired quality of final treated water, is generally 50 % to 300 % based on the flow rate of the starting water. This means that the flow rate of the nitrified water discharged from the nitrification unit is generally 150 % to 400 % based on the flow rate of the starting water, provided that the flow rate of the nitrified water flowing into the lagoon is substantially the same as the flow rate of the starting water.

In the foregoing two embodiments, when the submerged biofilter process is used for the aerobic biological treatment, the quality of treated water flowing into the lagoon can be improved, whereby the overall stability of the whole biological treatment process including the treatment in the lagoon can be improved to obtain a stable quality of final treated water. Furthermore, the submerged biofilter process is very easy to maintain and control and requires little labor, if any, while the area necessary for installing a submerged biofilter unit (packed-bed reactor) for carrying out the submerged biofilter process may advantageously be small to enable it to be installed in a small plot. Additionally stated, two submerged biofilter units are preferably used as the oxidation unit and the nitrification unit in the second embodiment.

The submerged biofilter is periodically washed for the purpose of preventing the packing media layer (filter media layer) thereof from clogging to discharge therefrom washing wastewater, which may then be sent to the lagoon either after solid-liquid separation or without solid-liquid separation. Solid-liquid separation is preferably done from the standpoint of the quality of final treated water obtained in the lagoon. Since this washing wastewater is high in the microorganism concentration, feeding of this washing wastewater to the lagoon can increase the concentration of facultative anaerobes in the lagoon to improve the efficiency of denitrification in the lagoon, and can also increase the concentration of aerobes in the lagoon to improve the efficiency of treatment of organic matter remaining in a low concentration in treated water obtained by the submerged biofilter process.

Since the submerged biofilter process in particular poses a problem that the packing media layer may be clogged with suspended solids contained in the organic wastewater as the starting water, the organic wastewater is desired to be preliminarily subjected to solid-liquid separation with a screen or the like.

Examples of packing media (filter media) for use in the submerged biofilter process include granular foamed plastic packing media, granular porous plastic packing media, cylindrical plastic mesh tube packing media, etc., which all have a specific gravity of less than 1, though not particularly limited thereto. Among them, cylindrical plastic mesh tube packing media are especially preferred since they are low in production cost, easy to handle, high in the capability of carrying, or retaining, microorganisms thereon, and high in overall oxygen transfer coefficient and hence high in treatment efficiency. As a preferred example of a submerged biofilter unit (packed-bed reactor) using mesh tubes as packing media, there can be mentioned a device as disclosed in Japanese Patent Laid-Open No. 168,790/1997 (this patent literature is incorporated herein by reference in its entirety).

The submerged biofilter unit as disclosed in Japanese Patent Laid-Open No. 168,790/1997 is a device for biological wastewater treatment, comprising a reactor tank in which a space for treating water to be treated is provided; an inflow means for feeding wastewater to be treated into that space; an outflow means for discharging wastewater already treated from that space; a frame for partitioning that space into a plurality of supporting layers; and a packing media layer in which a plurality of mesh tubes to retain microorganisms are arranged in parallel, provided that the packing media layer is provided in each of the supporting layers. This unit is excellent since it is so free of deformation, collapse and flotation of the mesh tubes that the arrangement of the packing media is hardly disordered not to cause distorted flow, or channeling, of water to be treated as well as air for aeration.

Usable examples of the lagoon include the aforementioned common lagoon without aeration, and a variety of the aforementioned improved lagoons. In the process of the present invention, however, the common lagoon without aeration will suffice in many cases due to the good quality of treated water flowing into the lagoon.

EXAMPLE 1

Organic wastewater obtained by subjecting manure-washing wastewater discharged from a pig pen to solid-liquid separation with a screen was used as the starting water to carry out experiments in accordance with the first embodiment. A submerged biofilter unit using cylindrical plastic mesh tubes as packing media as disclosed in Japanese Patent Laid-Open No. 168,790/1997 was used for the aerobic biological treatment of the wastewater. The capacity of a starting water tank was 1 m.$^3$ The capacity of the submerged biofilter was 1 m.$^3$ The capacity of a lagoon was 5 m.$^3$ The flow rate of the starting water was 5 m$^3$/day.

Changes in water quality are shown in Table 1.

TABLE 1

| | Starting Water | Aerobically Treated Water | Final Treated Water in Lagoon |
|---|---|---|---|
| $COD_{Cr}$ (mg/L) | 2250 | 225 | 105 |
| BOD (mg/L) | 1200 | 20 | <1 |
| $NH_4$—N (mg/L) | 220 | 2 | <1 |
| $NO_3$—N (mg/L) | 0 | 200 | <1 |

Almost all of $COD_{Cr}$ (COD measured using potassium dichromate), BOD and ammonium nitrogen ($NH_4$—N) were removed by the treatment with the submerged biofilter alone. The resulting treated water, when fed to and treated in the lagoon, was further purified with removal therefrom of nitric nitrogen ($NO_3$—N) in particular. Additionally stated, it was believed that $COD_{Cr}$ remaining in the final treated water in the lagoon was due to substances devoid of biodegradability.

EXAMPLE 2

Organic wastewater obtained by subjecting manure-washing wastewater discharged from a pig pen to solid-liquid separation with a screen was used as the starting water to carry out experiments in accordance with the second embodiment. The capacity of a starting water tank was 1 m.$^3$ An airtight suspended-growth denitrification unit (effective capacity: 1 m$^3$) capable of maintaining an anaerobic atmosphere was used as the denitrification unit with agitation done using a submerged agitator. Two submerged biofilter units using cylindrical plastic mesh tubes as packing media as disclosed in Japanese Patent Laid-Open No. 168,790/1997 (capacity of each submerged biofilter: 0.5 m$^3$) were respectively used as the oxidation unit and the nitrification unit. The capacity of a lagoon was 5 m.$^3$ The flow rate of the starting water was 5 m$^3$/day. The flow rate of nitrified water recycled from the nitrification unit back to the denitrification unit was 10 m$^3$/day.

Changes in water quality are shown in Table 2.

TABLE 2

| | Starting Water | Denitrified Water | Oxidized Water | Nitrified Water | Final Treated Water in Lagoon |
|---|---|---|---|---|---|
| $COD_{Cr}$ (mg/L) | 2250 | 407 | 167 | 155 | 103 |
| BOD (mg/L) | 1200 | 203 | 5 | <1 | <1 |
| $NH_4$—N (mg/L) | 220 | 73 | 60 | <1 | <1 |
| $NO_3$—N (mg/L) | 0 | 0 | 10 | 70 | <1 |

In this Example, part of the nitrified water was returned, or recycled back, to the denitrification unit wherein organic matter in the starting water and nitric nitrogen in the returned part of the nitrified water were removed. Thus, the organic matter load onto the oxidation unit was decreased to decrease BOD in the oxidized water from the oxidation unit, whereby nitrification in the nitrification unit proceeded easily. Furthermore, cleaner nitrified water was fed to the lagoon to enable the nitrogen load onto the lagoon to be decreased.

What is claimed is:

1. A process-for treatment of organic wastewater discharged from the livestock industry, comprising the step (1) of subjecting the organic wastewater to an aerobic biological treatment by a submerged biofilter process using one or two submerged biofilter unts, and the step (2) of subjecting the treated water obtained in the step (1) to a biological treatment in a lagoon; said one or two submerged biofilter units being one or two devices for biological wastewater treatment each comprising a reactor tank in which a space for treating water to be treated is provided, an inflow means for feeding wastewater to be treated into said space, an outflow means for discharging wastewater already treated from said space, a frame for partitioning said space into a plurality of supporting layers, and a packing media layer in which a plurality of mesh tubes to retain microorganisms are arranged in parallel, provided that said packing media layer is provided in each of said supporting layers.

2. A process for treatment of organic wastewater as claimed in claim 1, which further comprises, before the step (1), the step of subjecting a mixture of the organic wastewater and part of the treated water obtained in the step (1), recycled back and combined therewith, to a biological denitrification treatment.

3. A process for treatment of organic wastewater as claimed in claim 1, wherein wastewater obtained by washing said one or two submerged biofilter units used for said submerged biofilter process is also fed to and treated in said lagoon.

* * * * *